United States Patent
Katayama et al.

(10) Patent No.: US 9,570,205 B2
(45) Date of Patent: Feb. 14, 2017

(54) RADIATION MONITORING DEVICE

(71) Applicant: Mitsubishi Electric Corporation, Chiyoda-ku (JP)

(72) Inventors: Shohei Katayama, Chiyoda-ku (JP); Kenichi Moteki, Chiyoda-ku (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 184 days.

(21) Appl. No.: 14/337,538

(22) Filed: Jul. 22, 2014

(65) Prior Publication Data

US 2015/0198723 A1    Jul. 16, 2015

(30) Foreign Application Priority Data

Jan. 14, 2014  (JP) .................................. P 2014-3902

(51) Int. Cl.
G01J 1/00 (2006.01)
G21C 17/00 (2006.01)
(Continued)

(52) U.S. Cl.
CPC .................. G21C 17/00 (2013.01); G01T 1/17 (2013.01); G01T 7/005 (2013.01)

(58) Field of Classification Search
CPC .............. G01T 1/16; G01T 7/005; G01T 7/12; G21C 17/00
(Continued)

(56) References Cited

U.S. PATENT DOCUMENTS

2006/0126776 A1* 6/2006 Izumi ..................... G01T 1/17
                                                              376/255
2011/0144945 A1* 6/2011 Hayashi .................. G01T 1/17
                                                              702/183
(Continued)

FOREIGN PATENT DOCUMENTS

JP        61-108987 A    5/1986
JP        10-260262 A    9/1998
(Continued)

OTHER PUBLICATIONS

The Japan Radioisotope Association(JRIA), "Fundamentals of Radiation Handling", the Third Impression of the First Edition, Maruzen Company Limited, Dec. 1996, pp. 299-302.

*Primary Examiner* — David J Makiya
*Assistant Examiner* — Taeho Jo
(74) *Attorney, Agent, or Firm* — Buchanan Ingersoll & Rooney PC

(57) ABSTRACT

A radiation monitoring device comprises a radiation monitor and a test unit for testing the radiation monitor. The radiation monitor includes a radiation detector and a measurement unit. The test unit includes a test pulse generator and a test pulse controller. The measurement unit includes a counter circuit, a computing part that computes a count rate with the standard deviation kept constant, an input switching circuit. When a test mode is selected in the radiation monitor, the test pulse controller changes the repetition frequency of test pulses in a step-function manner to the same repetition frequency of a start count rate specified as reference, replaces a count rate in the computing part at current computing cycle with the start count rate, switches the input switching circuit to the test pulse input at next computing cycle to start the test, and then finishes the test after a predetermined time elapses.

6 Claims, 16 Drawing Sheets

(51) Int. Cl.
*G01T 7/00* (2006.01)
*G01T 1/17* (2006.01)

(58) Field of Classification Search
USPC .................................................. 250/336.1
See application file for complete search history.

(56) References Cited

U.S. PATENT DOCUMENTS

| | | | | |
|---|---|---|---|---|
| 2013/0327940 | A1* | 12/2013 | Nagai | G01T 1/18 250/336.1 |
| 2014/0073947 | A1* | 3/2014 | Rodriguez-Llorente | A61B 5/7203 600/476 |
| 2014/0183359 | A1* | 7/2014 | Tamaru | G01T 1/15 250/336.1 |

FOREIGN PATENT DOCUMENTS

| | | |
|---|---|---|
| JP | 2009-063351 A | 3/2009 |
| JP | 2012-047559 A | 3/2012 |

* cited by examiner

OUTPUT RESPONSE OF COUNT RATE TO STEP-FUNCTION INPUT
IN OUTPUT-TO-INPUT RESPONSE TEST

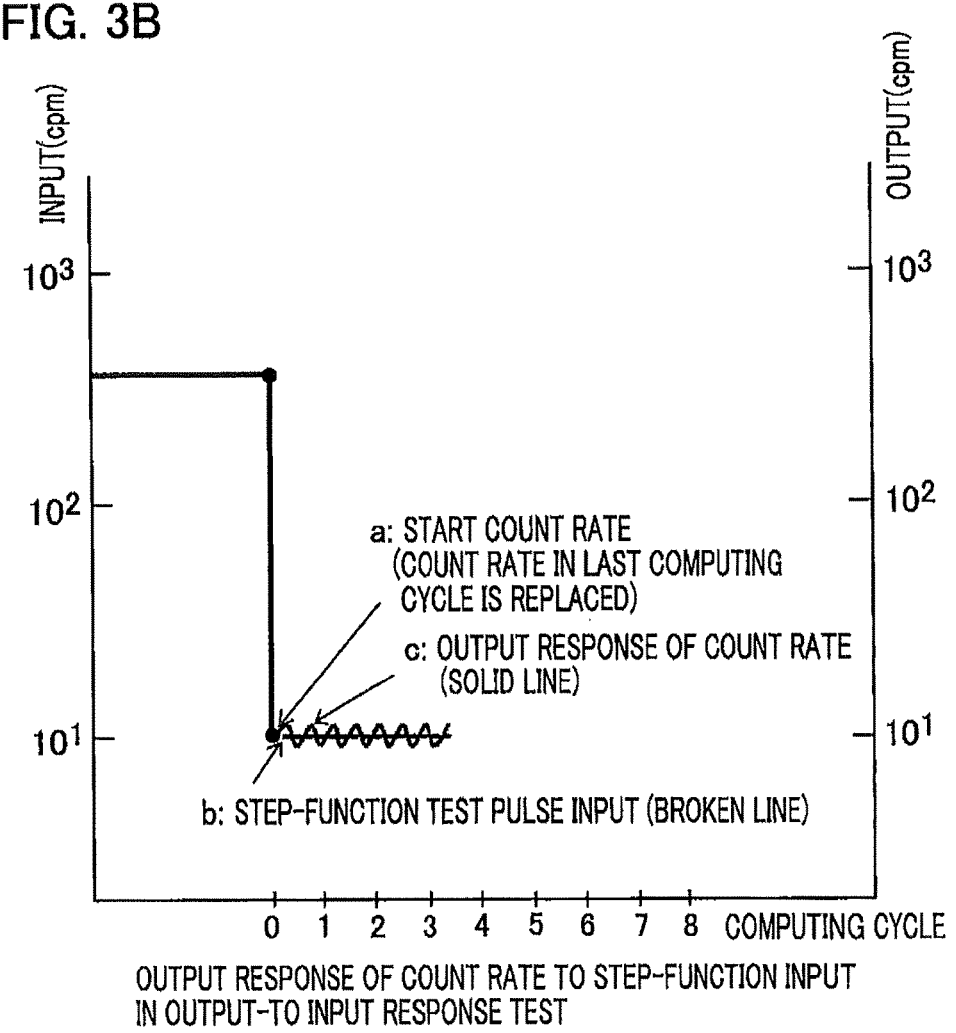

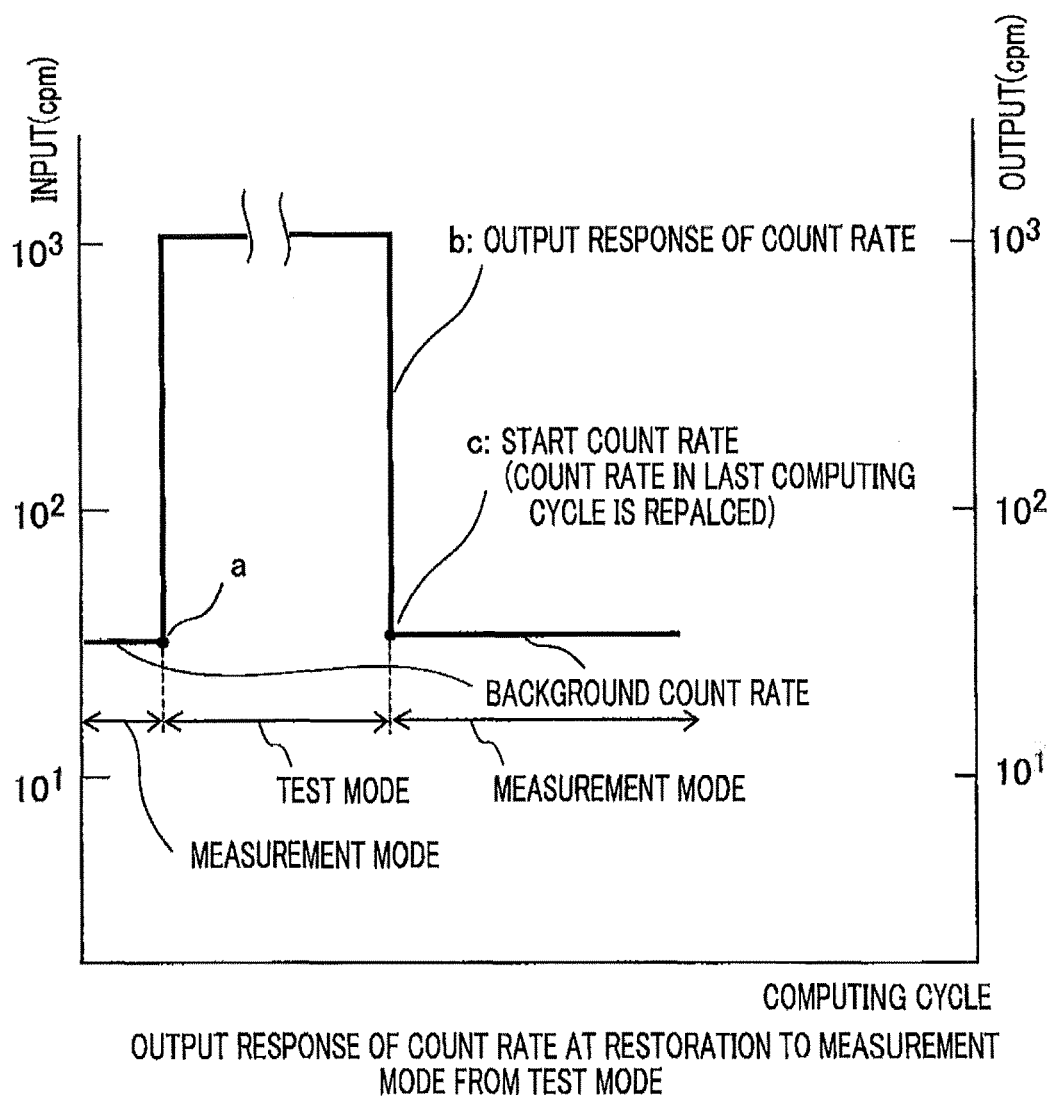

OUTPUT RESPONSE OF COUNT RATE TO STEP-FUNCTION INPUT
IN OUTPUT-TO-INPUT RESPONSE TEST

OUTPUT RESPONSE OF COUNT RATE TO STEP- AND RAMP-FUNCTION
INPUT FOR HIGH ALERT TEST

OUTPUT RESPONSE OF COUNT RATE TO STEP- AND RAMP-FUNCTION INPUT FOR LOW ALERT TEST

OUTPUT RESPONSE OF COUNT RATE TO STEP-FUNCTION INPUT
IN RESPONSE TIME TEST

RADIATION MONITORING DEVICE

BACKGROUND OF THE INVENTION

Technical Field

The present invention relates to radiation monitoring devices that are used for radioactive emission control or radiation control such as in nuclear reactor facilities and spent nuclear fuel reprocessing plants.

Background Art

A radiation monitoring device used such as in nuclear reactor facilities and spent nuclear fuel reprocessing plants includes a multi-channel radiation monitor that is provided with a detector for detecting radiation to output detection signal pulses and a measurement unit for receiving the detection signal pulses to measure a count rate (the count rate is a value that is obtained by dividing a count value by a unit time—a second or a minute is generally used as the unit time—and is expressed by the unit of "cps" or "cpm"); and a test unit that is constituted with a test signal generator for inputting test pulses to an individual radiation monitor (using the test pulses allows for generation of a desired repetition frequency, and for check on response of the output count rate to the input signal and on accuracy of the response) and a test signal controller for controlling the repetition frequency of the test pulses generated by the test signal generator and for switching between inputs of the detection signal pulses and the test pulses in the radiation monitor. The test signal controller controls an input switching circuit in the measurement unit of the radiation monitor to switch the test pulse input from the detection signal pulse input, and performs an output-to-input response test for measuring a response of the count rate to the repetition frequency of the test pulses (the output-to-input response test here means a test of measuring linearity of output to input) and performs an alert test for checking the count rate at an alert activation point by inputting test pulses having a repetition frequency that varies across an alert setting level. Soundness of each radiation monitor is thereby checked (the soundness here means a condition that satisfies an accuracy specified by the spec).

Each radiation monitor converts, when necessary, a measured count rate to an engineering value such as a dose equivalent rate (dose equivalent increment per unit time; dose equivalent is used to evaluate an effect of radiation on radiation-exposed persons and expressed as "absorbed dose×quality factor") to obtain a radiation dose. A high alert is set to a radiation level higher than the ordinary background level. For abnormality of a dose equivalent rate in a control area in such facilities and plants (it is confirmed that a dose equivalent rate is proportional to a count rate from measurements of dose equivalent rates and count rates at various points using a reference radiation source) or radioactivity in a process line in such plants (radioactivity is proportional to a count rate because double in radioactivity leads to double in radiation emission and to double in the count rate of detected pulses), the high alert is issued to give notice to operators and a necessary line isolation is automatically performed (for example, if there is an emission end port in the line, the line is shut-off by the high alert). Furthermore, a low alert is set to a radiation level lower than the ordinary background level. For detection signal loss due to failure of a radiation monitor or a low count rate of detection signal, the low alert is issued to give notice to operators.

Accuracy of measurement response and accuracy of the alert activation are checked by inputting test pulses to a computing part. A test signal controller changes the repetition frequency of the test pulses output from a test signal generator in a step-function or a ramp-function manner according to a test item (refer to JP 1110-260262 A). In addition, the alerts are blocked before the alert test is started so that the high alert and the low alert are not issued externally from the radiation monitoring device during the test period, and the block is released after the test is completed. These block operations are set manually. During the period of blocking the alert (the test time is shorter than the blocking period), an in-test warning is output.

Since a radiation dose measured by a radiation monitor fluctuates statistically (this is due to intrinsic atomic disintegration occurring at random; refer to The Japan Radioisotope Association, "Fundamentals of Radiation Handling" the Third Impression of the First Edit., Maruzen, December, 1996, pp. 299-302), the radiation monitor maintains a desired measurement accuracy by automatically controlling the time constant according to a count rate to keep the standard deviation constant. Moreover, the radiation monitor needs to perform a measurement covering a wide count-rate range from about 10 to $10^7$ cpm (count per minute: the number of radiation counts per minute), and measures a count rate over the wide range without changing the range to eliminate discontinuity associated with range changing. Because a count rate responds with the time constant and the time constant is inversely proportional to the square of standard deviation and to the count rate (refer to "Fundamental of Radiation Protection") and because it takes time to perform an output-to-input response test for a measurement range of every decade and for a high and a low alert tests, a contrivance is made to shorten the response time of a count rate to a test pulse input by combining, depending on each test item, input of test pulses having a repetition frequency changing in a step-function manner and input of test pulses having a repetition frequency varying in a ramp-function manner and by setting beforehand the amount of step change and the slope of ramp-function variation (refer to JP H10-260262 A).

However, a response test at a low count rate still needs to take a long time. For example, under the condition of a standard deviation of 2.6%, the lower limit of measurement range of 10 cpm, and the background of 50 cpm, the test takes approximately 40 minutes to approach to 10 cpm after a test pulse of 1 cpm is input in a step-function manner. Even inputting test pulses of 0 cpm to accelerate the response achieves no significant improvement effect.

In the conventional radiation monitoring device, as described above, test time is shortened by controlling, on the basis of a changing pattern of a step-function input and a ramp-function input set beforehand based on a target value, the repetition frequency of the input test pulses so as to immediately approach near the target value by the step-function input and then gradually approach toward the target value by the ramp-function input. However, since a count rate responds with the time constant and the time constant is inversely proportional to the square of the standard deviation and to the count rate (refer to "Fundamental of Radiation Protection"), execution of a test item particularly for a low count rate will fall into a situation of simply waiting for lowering of the count rate with a time constant, raising a problem that the test inevitably takes a long time. Moreover, almost all channels (the channels here mean respective ones of a plurality of radiation monitors in a radiation monitoring device) are in the condition of continuous measurement during operation of such a plant, and there is inevitably a channel that should not be in a condition of missing measurement for a long time because of need for continuous measurement even during a regular inspection, requiring further improvement for demand for test time reduction to minimize the missing measurement.

Furthermore, when a test item is altered midway during a scheduled test, a test input pattern needs to be reset and additionally computed in accordance with the altered test item and an altered target count rate, raising a problem in quick responsiveness. That is, when an unscheduled alteration happens, the test time increases drastically and the test may not be completed within the scheduled time in some cases.

The present invention is made to resolve the above problems and aimed at providing a radiation monitoring device that is capable of significantly reducing a test time and flexibly altering a test item when soundness of a device needs to be checked urgently.

SUMMARY OF THE INVENTION

A radiation monitoring device according to the present invention includes a radiation monitor that measures radiation and a test unit that tests the radiation monitor, wherein either a measurement mode or a test mode is selectable, and the test mode is selected at a test and the measurement mode is selected ordinarily at radiation monitoring. The radiation monitor includes a radiation detector that detects radiation and outputs detection signal pulses and a measurement unit that receives the detection signal pulses and measures a count rate. The test unit includes a test pulse generator that generates test pulses and a test pulse controller that controls a repetition frequency of the test pulses output from the test pulse generator and switches input of the measurement unit. The measurement unit includes a pulse amplifier circuit that shapes waveform of the detection signal pulses and amplifies height of the detection signal pulses, and removes high frequency noise superimposed on the detection signal pulses; a noise discriminating and removing circuit that discriminates and removes a noise pulse from the output pulses from the pulse amplifier circuit, and outputs digital pulses; a counter circuit that receives and counts the digital pulses; a computing part that receives count values output from the counter circuit and computes the count rate with a standard deviation of the count values kept constant; a display and operation part that displays an output of the computing part and receives an operation for the measurement unit; and an input switching circuit that switches an input of the pulse amplifier circuit to either one of an input of the detection signal pulses, neutral with no input, or an input of the test pulses under control of the test pulse controller via the computing part, wherein when the test mode is selected and a test item is chosen, the test pulse controller switches the input switching circuit to neutral; then changes the repetition frequency of the test pulses in a step-function manner to the same repetition frequency of a start count rate set arbitrarily or specified as a reference according to the test item; and replaces a count rate in the computing part at current computing cycle with the start count rate set arbitrarily or specified according to the test item; then switches the input switching circuit to the test pulse input from neutral at next computing cycle; starts the test; and then finishes the test after a predetermined time elapses.

In the radiation monitor, either the measurement mode or the test mode is selectable. When the test mode is selected and a test item is chosen, the test pulse controller switches the input switching circuit to neutral; then, changes the repetition frequency of test pulses in a step-function manner to the same repetition frequency of a start count rate set arbitrarily or specified as a reference according to the test item; and replaces a count rate in the computing part at current computing cycle with the start count rate set arbitrarily or specified according to the test item; then switches the input switching circuit to the test pulse input from neutral at next computing cycle of the computing part to start the test; and then finishes the test after a predetermined time elapses. Therefore, the test time can be significantly reduced and a test item can be flexibly altered.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a graph showing a response of the radiation monitoring device according to Embodiment 1;

FIG. 5B is a flowchart of the latter half of the test mode according to Embodiment 2;

DETAILED DESCRIPTION OF EXEMPLARY EMBODIMENTS OF THE INVENTION

Embodiment 1

Figure 1:
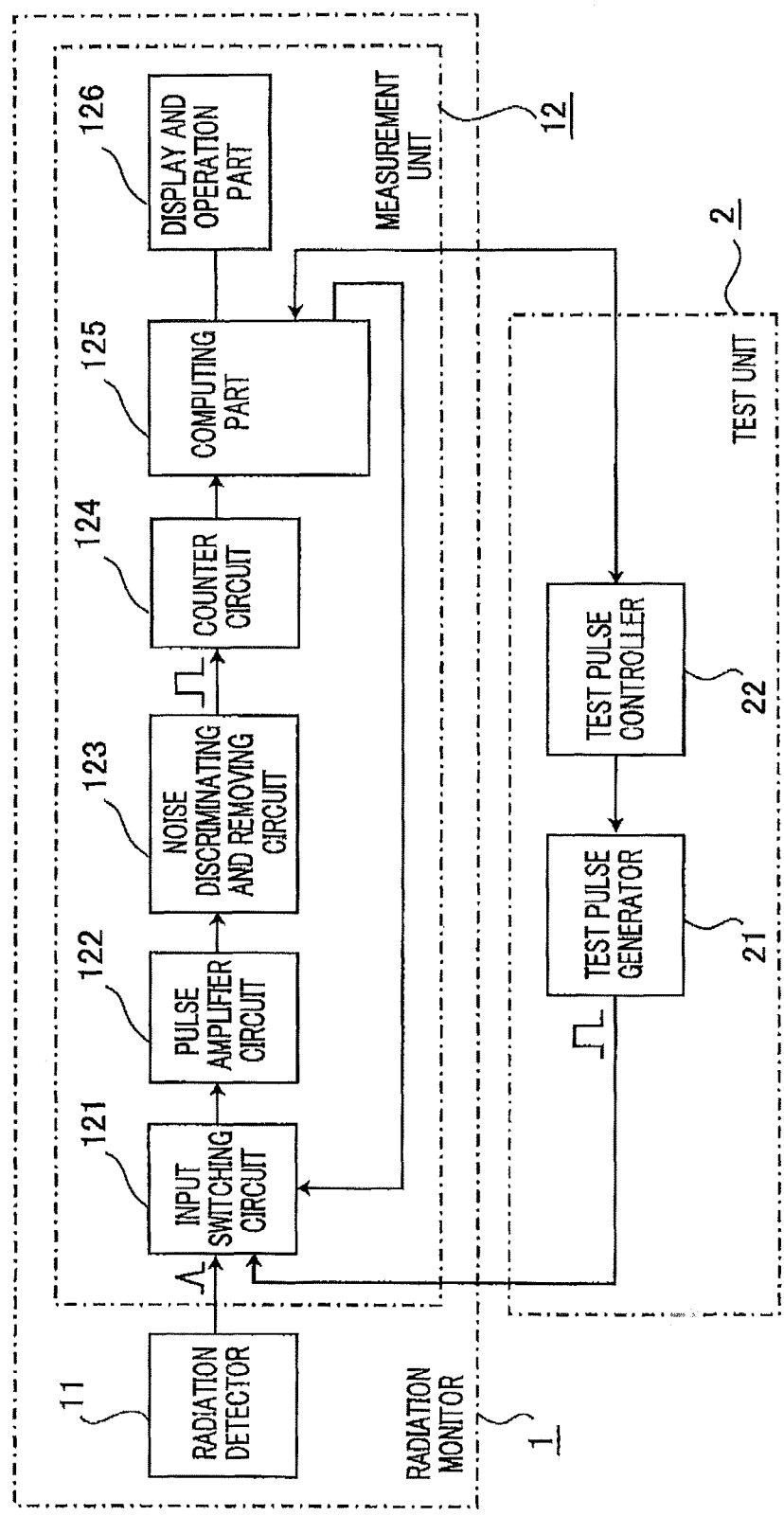
FIG. 1 is a diagram showing a configuration of a radiation monitoring device according to Embodiment 1 of the present invention.

Embodiment 1 of the present invention is described below with reference to FIG. 1. FIG. 1 is a diagram showing a configuration of a radiation monitoring device according to Embodiment 1. The radiation monitoring device includes a radiation monitor 1 that measures radiation and a test unit 2 that performs a test on accuracy of the radiation measurement. The radiation monitor 1 is provided with a radiation detector 11 that detects radiation to output detection signal pulses (analog pluses) and a measurement unit 12 that measures the count rate of the detection signal pulses being input. The test unit 2 is provided with a test pulse generator 21 that generates test pulses and a test pulse controller 22 that controls the repetition frequency of the test pulses output from the test pulse generator 21 and switches input of the measurement unit 12.

The test pulse generated by the test pulse generator 21 is digital pulses, and their repetition frequency and time variation of the frequency are determined by a control signal from the test pulse controller 22. In the measurement unit 12, an input switching circuit 121 switches its input, in accordance with a control signal from the test pulse controller 22 via a computing part 125, to either a detection signal pulse input for inputting the detection signal pulses from the radiation detector 11, neutral with no input, or a test pulse input for inputting the test pulses from the test pulse generator 21.

The detection signal pulses or the test pulses input to the measurement unit 12 from the input switching circuit 121 is amplified and high frequency noise superimposed on the pulses is removed by a pulse amplifier circuit 122. A noise discriminating and removing circuit 123 outputs digital pulses, for example, when the voltage of the amplified pulses is within a predetermined range, and rejects pulses as noise when the voltage is out of the predetermined voltage range. In addition, the noise discriminating and removing circuit 123 may additionally have a function of discriminating and removing noise on the basis of difference in noise waveform with respect to the signal pulses by measuring waveform of the amplified pulses.

A counter circuit 124 counts the digital pulses output from the noise discriminating and removing circuit 123 to output a count value. The computing part 125 receives the count value and computes a count rate with standard deviation of the count value kept constant, as described later, so that measurement accuracy does not vary depending on the count rate, i.e., measurement is performed with stable accuracy. Then, the computing part 125 converts the count rate to an engineering vale such as a dose equivalent rate when necessary, and compares the obtained count rate or the obtained engineering value with an alert setting level to output a high alert or a low alert along with the count rate or the engineering value. The following describes a case of outputting the alert along with the count rate.

The high alert is generally set to a level higher than a background, for example, on the basis of an allowable level in radiation emission control. The low alert is set generally to a level lower than the background in order to detect a loss or a reduction of the detection signal pluses due to, for example, a fault in the radiation detector 11. A display and operation part 126 is provided for displaying an output from the computing part 125 as well as for inputting an operation for the measurement unit 12.

The radiation monitor 1 operates when either the measurement mode or the test mode is selected. When the test mode is selected with a mode selection button and then a test item is chosen with a test item selection button and "OPTION" is selected with "AUTO/OPTION" selection button, the test pulse controller 22 starts a test. On starting, the test pulse controller 22 accesses the computing part 125 in the measurement unit 12 of the radiation monitor 1 to switch the measurement unit 12 to the test mode and to switch the input of the input switching circuit 121 to the test pulse input from the detection signal pulse input, and then inputs the test pulses into the radiation monitor 1.

Since a count rate, which is a radiation measurement result, varies statistically, the count rate can be measured with the standard deviation σ kept constant, for example, by calculating a time constant τ at every computing cycle on the basis of a standard deviation σ and a count rate n (last) at last computing cycle and by calculating a count rate n (current) at current computing cycle on the basis of the time constant τ, a constant cycle time ΔT, current count value ΔN, and the count rate n (last), as shown in the following Equations (1) to (5). Thus, keeping constant the standard deviation can ensures a predetermined accuracy. That is, because increase in the count rate n causes reduction in the time constant τ, i.e., reduction in 2τ corresponding to the measurement time as shown by Eq. (1) (refer to "Fundamental of Radiation Protection"), the measurement can be performed so that 2nτ (=σ²) is always kept constant. Specifically, a standard deviation σ of 0.1 is the case when 100 counts are counted with a count rate n of 100 cpm for 2τ=one minute or the case when 100 counts are counted with a count rate n of 200 cpm for 2τ=30 seconds. When the standard deviation is 0.01, the measurement time corresponding to 2τ becomes longer since 10,000 counts are needed.

$$\sigma = 1/(2n\tau)^{1/2} \qquad \text{Eq. (1)}$$

$$\tau = 1/(2n\sigma^2) \qquad \text{Eq. (2)}$$

$$n(\text{current}) = n(\text{last})*(1-\alpha) + (\Delta N/\Delta T)*\alpha \qquad \text{Eq. (3)}$$

$$\alpha = 1 - \exp(-\Delta T/\tau) \qquad \text{Eq. (4)}$$

$$\tau = 1/\{2*n(\text{last})*\sigma^2\} \qquad \text{Eq. (5)}$$

Figure 2:
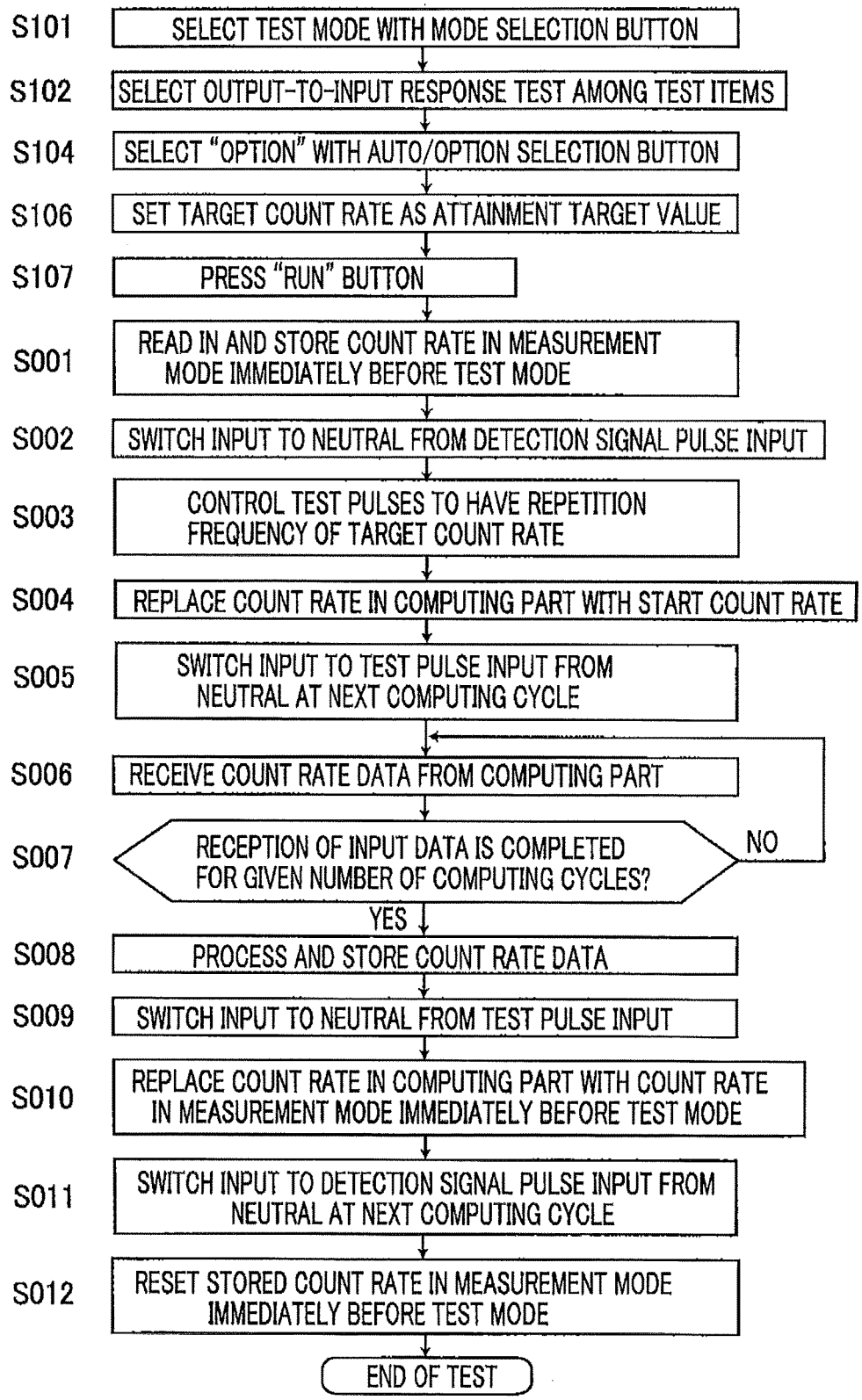
FIG. 2 is a flowchart of a test mode according to Embodiment 1.

FIG. 2 is a flowchart for explaining a control procedure of the test pulse controller 22 and operations of the test pulse generator 21 and the computing part 125, for example, when a check is made for measurement accuracy of an arbitrary point within a measurement range. As shown in FIG. 2, first, the test mode is selected with a mode selection button, an output-to-input response test is chosen among test items, the "OPTION" button (written as just "OPTION" hereinafter) is selected with "AUTO/OPTION" selection button, a target count rate is set as an attainment target value, and a "RUN" button is pressed. Then, the test pulse controller 22 starts the following test steps. In S001, a count rate at the computing cycle in a measurement mode immediately before the test mode is read in from the computing part 125 and stored in the test pulse controller 22. In S002, the input of the input switching circuit 121 is switched to neutral from the detection signal pulse input. In S003, the test pulse generator 21 is controlled to generate test pulses having a repetition frequency for the target count rate. In S004, the count rate in the computing part 125 is substituted for a start count rate that is a count rate at the start of the test. In S005, the input of the input switching circuit 121 is switched at next computing cycle to the test pulse input from neutral. Then, the test is started by input of the test pulses into the measurement unit 12.

The computing part 125 computes a count rate of the test pulse input at every computing cycle. The test pulse controller 22 receives count rate data in the test mode from the computing part 125 in S006, and determines in S007 whether the reception of the data is completed for a given number of computing cycles (the number of reception data, i.e., the number of data acquisitions is equal to the given number of computing cycles). If the determination result is "YES", the count rate data is processed and stored in S008. In S009, the input of the input switching circuit 121 is switched to neutral from the test pulse input, and then the count rate in the computing part 125 is replaced with the count rate that is stored immediately before the test mode in S010. In S011, the input of the input switching circuit 121 is switched at next computing cycle to the detection signal pulse input from neutral, and the count rate stored in the measurement mode immediately before the test mode is reset in S012. Then, the test is finished. Note that if the determination result in S007 is "NO", the process returns to S006.

Fluctuation in the count rate is of ±2 count difference in maximum and expected to occur periodically. For example, when a count rate is output sequentially with fluctuation of 0, +1, +2, +1, 0, −1, −2, the count rate fluctuates in eight computing cycles. Accordingly, data acquisition for as much as ten computing cycles adopted as the given number of computing cycles allows full evaluation of a maximum and a minimum deviations.

Figure 3A:
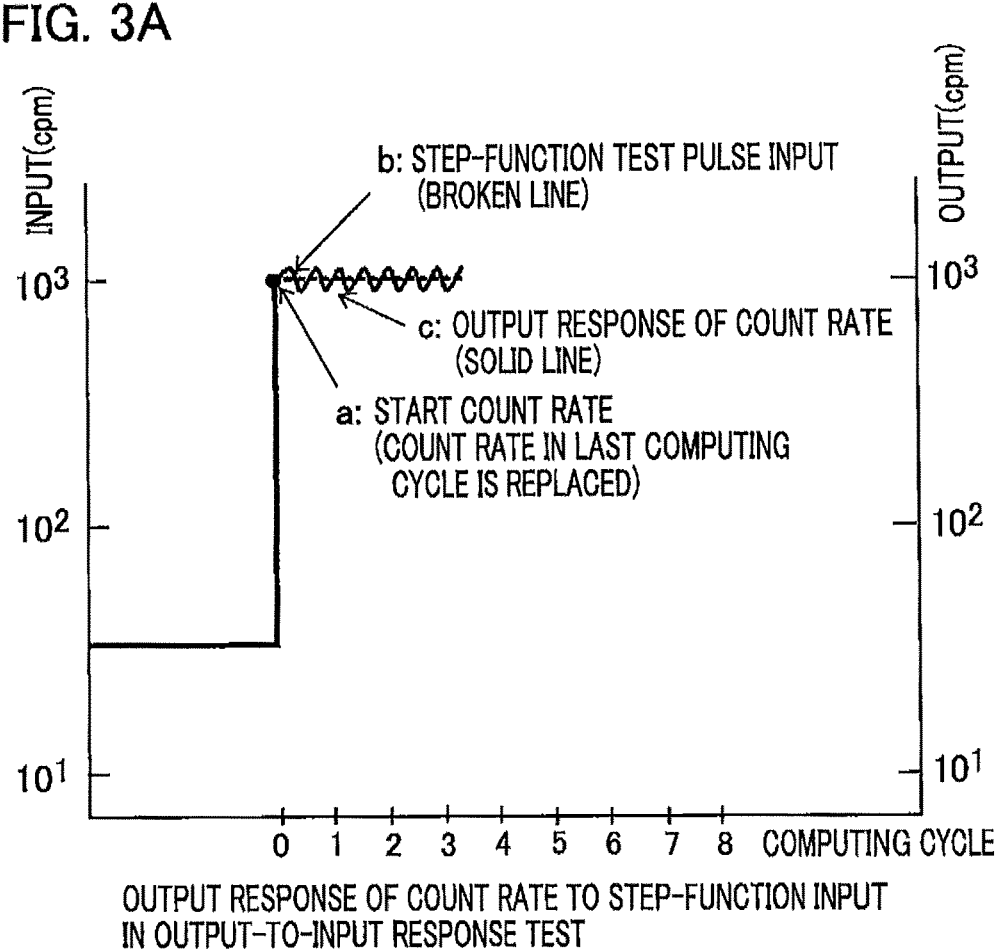
FIG. 3A is a graph showing a response of the radiation monitoring device according to Embodiment 1.

FIGS. 3A and 3B are graphs showing count rate responses to input of the radiation monitor 1 in output-to-input response tests. FIG. 3A shows a response when the test pulses increase in a step-function manner, and FIG. 3B shows, in contrast, a response when the test pulses decrease in a step-function manner. In each figure, "a" represents a start count rate as well as representing a test count rate and a target count rate. Taking these three count rates as the same value allows for eliminating a time-constant caused response between from a count rate in the measurement mode to the target count rate. A count rate output vindicated by a solid line represents a response, which fluctuates up and down by the error amount due to digital computing, to a repetition frequency b of a test pulse input of a constant level indicated by the broken line. The test pulse controller 22 receives count rate data for the given number of computing cycles from the computing part 125, calculates an accuracy with respect to the target count rate by regarding as a deviation a positive/negative maximum fluctuation relative to the constant level indicated by "c", and save it as test data. The test data in the test pulse controller 22 can be displayed for viewing and read out to a mobile memory as well.

FIG. 4 is a graph showing a response of the count rate at resumption to the measurement mode from the test mode. A start count rate in the computing part 125 at the resumption is replaced with a stored count rate in the measurement mode immediately before the test mode. A symbol "a" represents the count rate in the measurement mode immediately before the test mode. A symbol "b" represents the count-rate output response due to the forced replacement of the count rate in the computing part 125 with the count rate in the measurement mode immediately before the test mode. A symbol "c" represents the start count rate replaced, at the start timing of the measurement mode, with the count rate in the measurement mode immediately before the test mode.

As has been described above, in the radiation monitor 1, either the measurement mode or the test mode is selectable. The test pulse controller 22, when performing an output-to-input response test by switching the measurement mode to the test mode, switches the input of the input switching circuit 121 to neutral with no input and replaces a count rate in the computing unit 125 with a start count rate, and switches the input for the computing part 125 to the test pulse input, and then starts the test from the start count rate. Further, the test pulse controller 22 stores a count rate in the measurement mode immediately before the test mode, and returns it when the measurement mode is resumed from the test mode, thus eliminating a response time required for the count rate output to approach toward a target count rate with a time constant. Furthermore, the test is started from a balanced condition between the repetition frequency of the test pulses and the count rate output, obtaining test data having a measurement accuracy intrinsically targeted for the output-to-input response within a short time. Accordingly, the measurement mode is quickly resumed from the test mode, reducing the test time significantly.

Embodiment 2

In Embodiment 1, the operation of the test pulse controller 22 is described when checking measurement accuracy at a test point. In Embodiment 2, a description will be made for sequential execution of routine tests at preset target count rates over the entire measurement ranges of the radiation monitor 1. For example, over a measurement range from a lower limit of 10 cpm to an upper limit of $10^7$ cpm, the test pulse controller 22 automatically performs sequential tests at a test point in each of the decades by controlling the test pulse generator 21 and the computing part 125. The procedure and the operation are described with reference to FIGS. 5A and 5B.

Figure 5A:
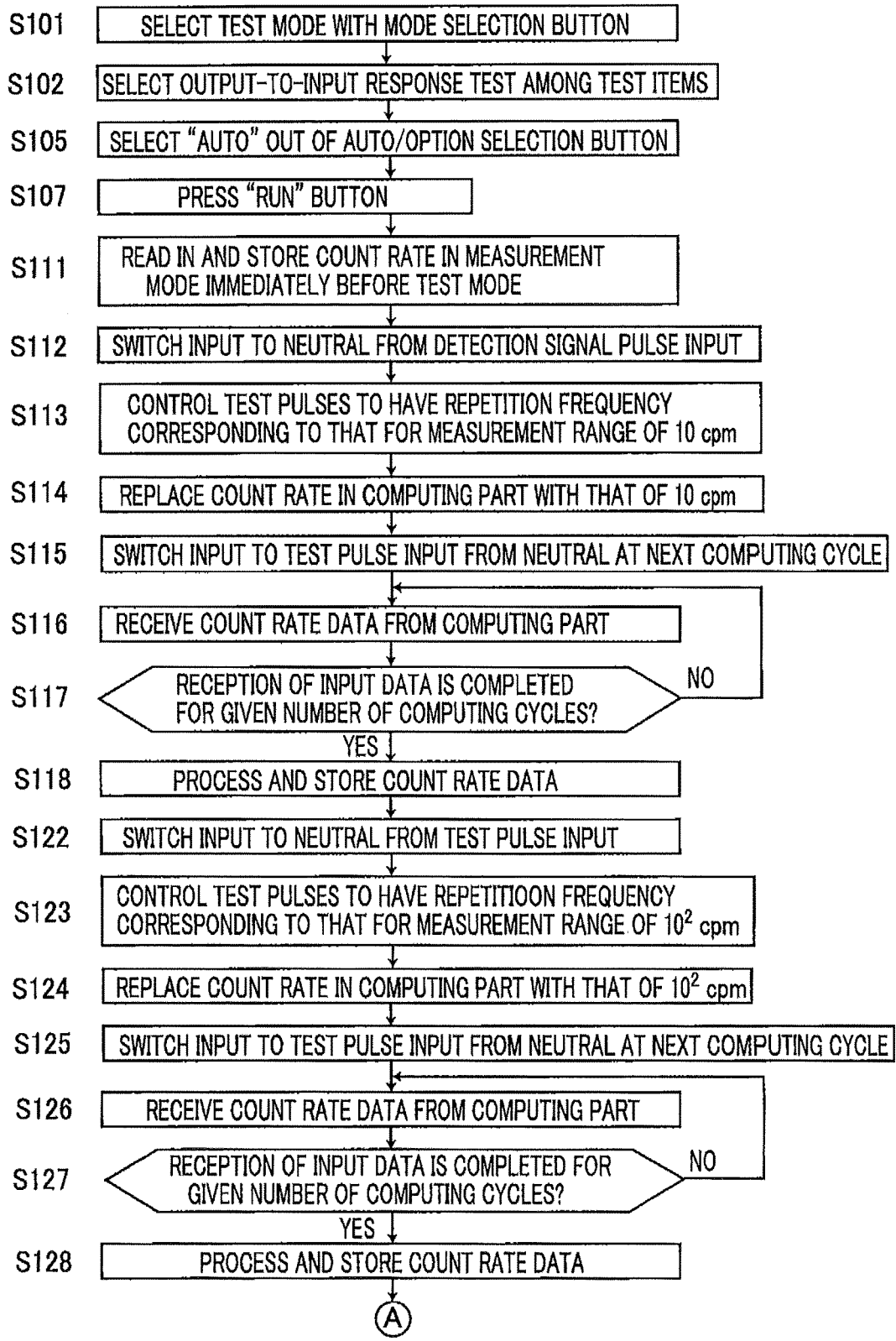
FIG. 5A is a flowchart of the first half of a test mode according to Embodiment 2 of the present invention.

As shown in FIG. 5A, the test mode is selected with the mode selection button, the output-to-input response test is chosen next among the test items, "AUTO" is selected with "AUTO/OPTION" selection button, and the "RUN" button is pressed. Then, the test pulse controller 22 starts a sequential output-to-input response test. On starting the test, the test pulse controller 22 executes the following steps. In S111, a count rate at last computing cycle in the measurement mode immediately before the test mode is read in from the computing part 125 and stored it. In S112, the input of the input switching circuit 121 is switched to neutral from the detection signal pulse input. Next, in S113, the test pulse generator 21 is controlled to generate test pulses having a repetition frequency corresponding to that at a test point in the lower limit measurement range of 10 cpm. In S114, the count rate in the computing part 125 is replaced with a count rate the same as a count rate that is a start count rate at the test point. Then, in S115, the input of the input switching circuit 121 is switched at next computing cycle to the test pulse input from neutral. Then, test pulses are input to the measurement unit 12. The test is thus started for the test point. The computing part 125 computes a count rate of the test pulse input at every computing cycle. The test pulse controller 22 receives count rate data in the test mode from the computing part 125 in S116 and determines in S117 whether the reception of the data is completed for a given number of computing cycles. If the determination result is "NO", the process returns to S116. If the determination result is "YES", the data is processed and stored in S118. Then, the output-to-input response test for the measurement range of 10 cpm is finished.

Next, in S122, the input of the input switching circuit 121 is switched to neutral from the test pulse input. In S123, the test pulse generator 21 is controlled to generate test pulses having a repetition frequency corresponding to that at next test point in a measurement range of $10^2$ cpm. In S124, the count rate in the computing part 125 is replaced with a count rate the same as a count rate that is a start count rate at the test point. Then, in S125, the input of the input switching circuit 121 is switched to the test pulse input from neutral at next computing cycle. Then, the test pulses are input to the measurement unit 12. The test is thus started for the test point. The computing part 125 computes a count rate of the test pulse input at every computing cycle. The test pulse controller 22 receives count rate data in the test mode from the computing part 125 in S126 and determines in S127 whether the reception of the data is completed for the given number of computing cycles. If the determination result is "NO", the process returns to S126. If the determination result is "YES", the data is processed and stored in S128. Then, the output-to-input response test for the measurement range of $10^2$ cpm is finished.

Figure 5B:
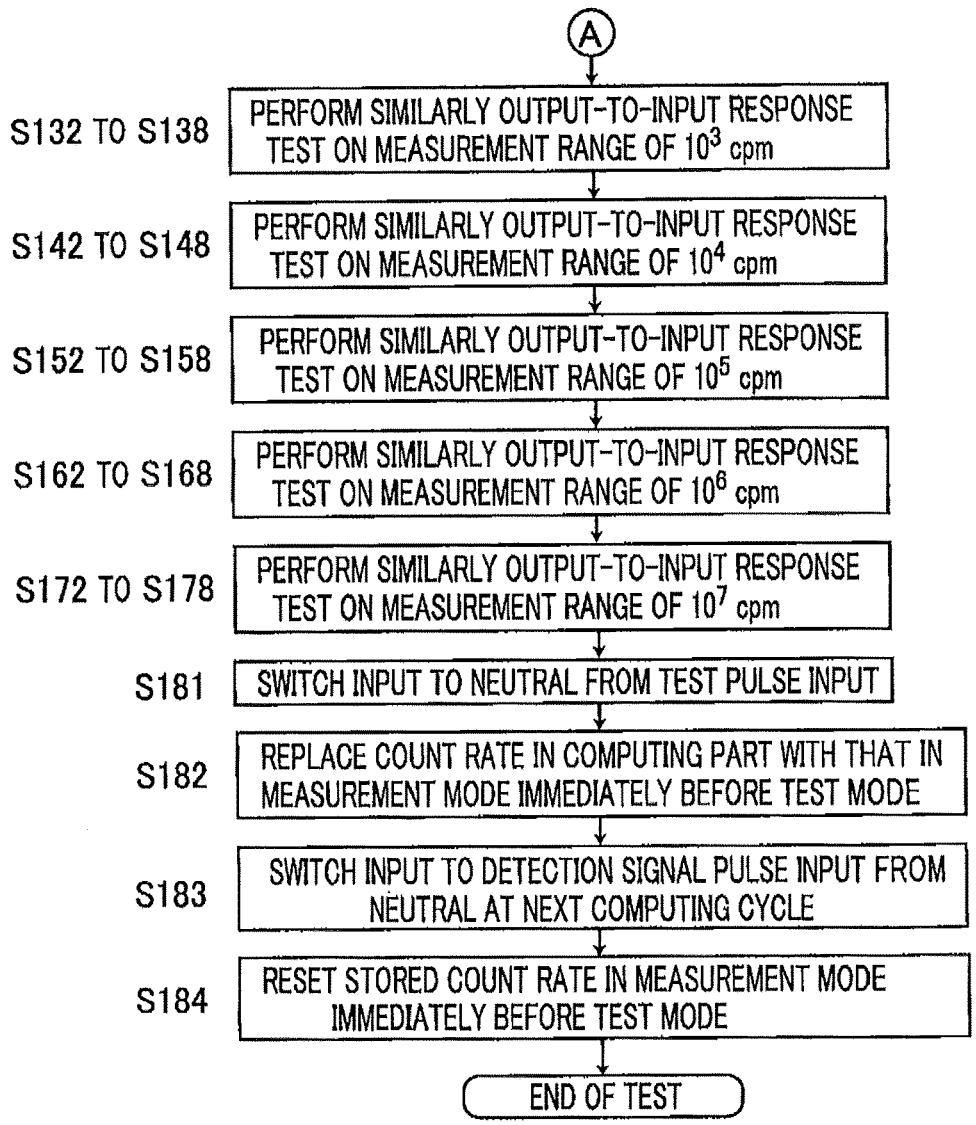
FIG. 5B is a graph showing a response of the radiation monitoring device according to Embodiment 1.

Likewise, as shown in FIG. 5B, an output-to-input response test is executed for the measurement range of $10^3$ cpm in S132 to S138, an output-to-input response test is executed for the measurement range of $10^4$ cpm in S142 to S148, an output-to-input response test is executed for the measurement range of $10^5$ cpm in S152 to S158, an output-to-input response test is executed for the measurement range of $10^6$ cpm in S162 to S168, and an output-to-input response test is executed for the measurement range of $10^7$ cpm in S172 to S178. After the output-to-input responses are measured at the test points from the lower limit of the measurement range to the upper limit of the measurement range at one decade intervals, the input of the input switching circuit 121 is switched to neutral from the test pulse input in S181. In S182, the count rate in the computing part 125 is replaced with the stored count rate in the measurement mode immediately before the test mode. In S183, the input of the input switching circuit 121 is switched at next computing cycle to the detection signal pulse input from neutral, and the stored count rate in the measurement mode immediately before the test mode is reset in S184. Then, the output-to-input response test is finished.

Figure 6:
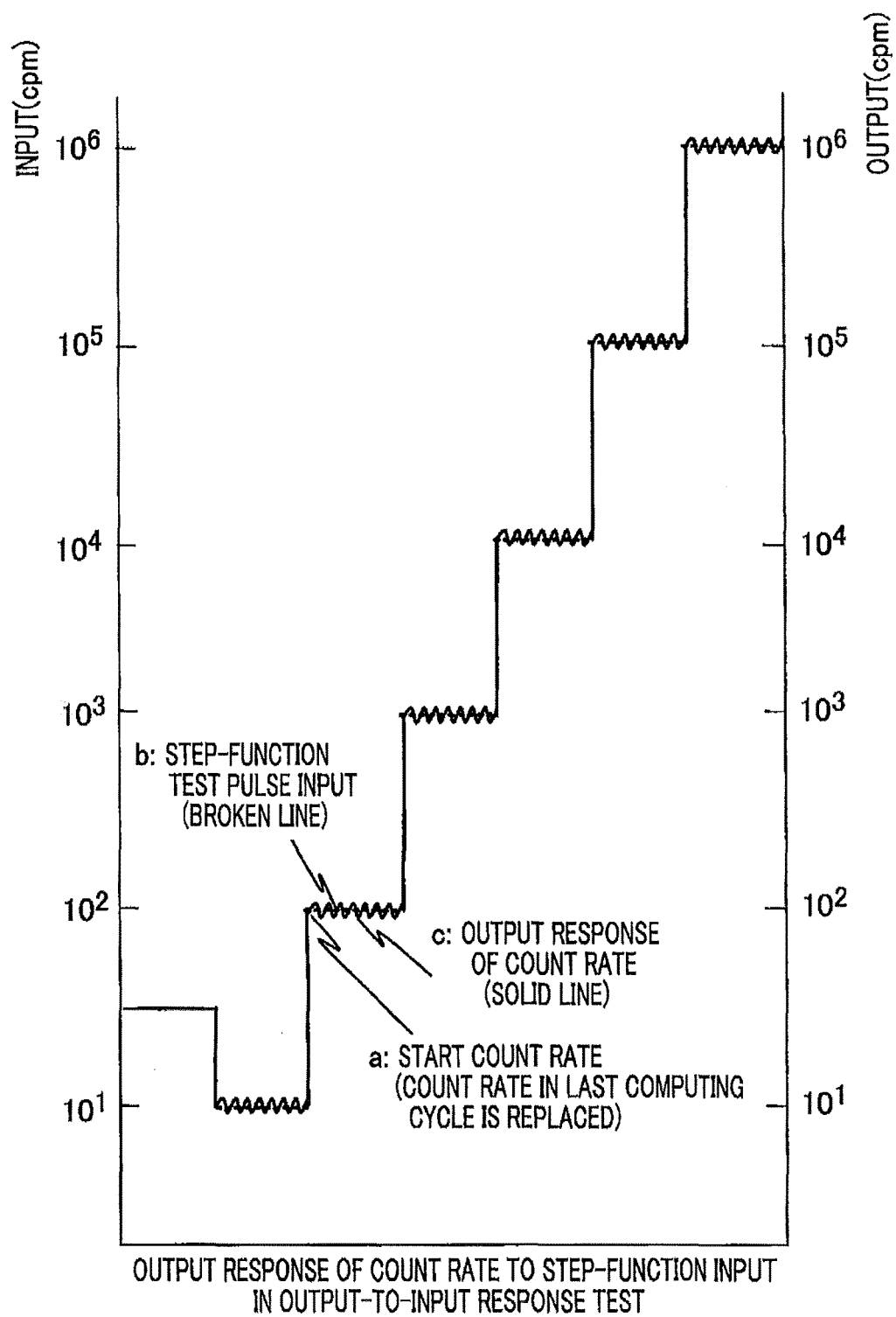
FIG. 6 is a graph showing a response of the radiation monitoring device according to Embodiment 2.

FIG. 6 shows an example of response of the count rate to the test input in the case of performing the output-to-input response test with the test points being changed, for example, from the lower limit of measurement range to the upper limit of measurement range at one decade intervals. The symbol "a" represents the start count rate at the test point for the measurement range of $10^2$ cpm, "b" (broken line) represents the repetition frequency of the test pulses, and "c" (solid line) represents the response of count rate output. When the test pulse controller 22 replaces last count rate in the computing part 125 with the start count rate a and changes the repetition frequency of the test pulses toward the start count rate a in a step-function manner as shown by "b", the count rate output c responds with a digital error fluctuation. Note that the output-to-input response tests are continuously executed without breaks with the repetition frequencies of the input test pulses being sequentially changed in step-function manners toward the respective start count rates a from the lower limit of measurement range to the upper limit of measurement range in an increment of one decade.

As has been described above, the test pulse controller 22 controls the input switching circuit 121 to input step-function test pulses having a repetition frequency corresponding to that at a test point in each output-to-input response test and performs efficiently the output-to-input response tests sequentially at preset test points over the entire measurement range of the radiation monitor 1. Moreover, at changing from the test mode to the measurement mode, the count rate is restored quickly to that in the measurement mode immediately before the test mode, reducing the test time of the output-to-input responses significantly.

Embodiment 3

In Embodiment 3, an alert test is described. The test pulse controller 22 controls the test pulse generator 21 to vary the repetition frequency of the test pulses in a ramp-function manner from a start point near an alert setting level—the time rate of the variation is approximately {(start count rate)−(count rate at the alert setting level)}/(time constant)—so that the repetition frequency gradually cross the alert setting level.

Figure 7A:
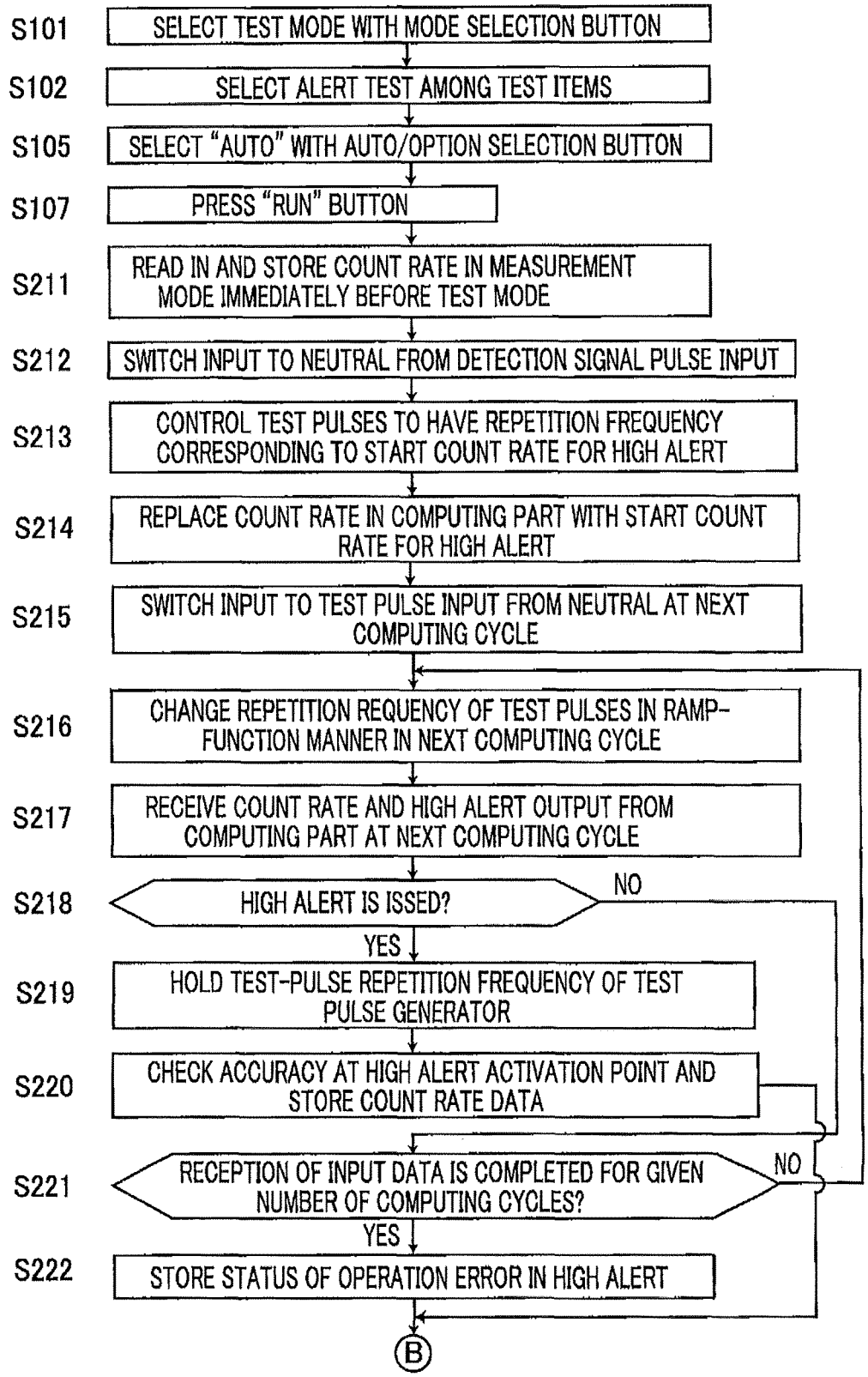
FIG. 7A is a flowchart of the first half of a test mode according to Embodiment 3 of the present invention.

An operation procedure of the alert test is described with reference to FIG. 1 and FIGS. 7A and 7B. First, in the case of a high alert test, as shown in FIG. 7A, the test mode is selected with the mode selection button, an alert test is chosen next among the test items, "AUTO" is selected with "AUTO/OPTION" selection button, and the "RUN" button is pressed. Then, the test pulse controller 22 starts the high alert test. On starting the test, the test pulse controller 22 executes the following steps. In S211, a count rate in a measurement mode immediately before the test mode is read in from the computing part 125 and stored. Then, the input of the input switching circuit 121 is switched to neutral from the detection signal pulse input in S212. In S213, the test pulse generator 21 is controlled to generate test pulses having a repetition frequency corresponding to that of a start count rate for the high alert test. Then, a count rate in the computing part 125 is replaced with a count rate the same as the start count rate for the high alert test in S214. In next S215, the input of the input switching circuit 121 is switched to the test pulse input from neutral at next computing cycle. Then, the test pulses are input to the measurement unit 12. The high alert test is thus started. Then, in 216, the repetition frequency of the test pulses from the test pulse generator 21 is varied in a ramp-function manner in the subsequent computing cycles—the ramp-function variation is approximated by repetition of a minimum step increment outputtable by the test pulse generator 21 and is emulated by each minimum step increment. The computing part 125 computes a count rate of the test pulse input at every computing cycle, and determines whether the count rate satisfies the condition that the count rate becomes a high alert setting level or larger. If the condition is satisfied, the high alert is issued and repetition frequency of the test pulse output is held at the alert-issue count rate.

The test pulse controller 22 receives the count rate and the high alert output from the computing part 125 at next computing cycle in S217, and determines in next S218 whether the high alert is issued. If the determination result is "YES" (i.e., the high alert has been issued), the test pulse generator 21 is controlled to hold the repetition frequency of the test pulses in S219, and accuracy of the count rate data at the high alert activation point is checked and the count rate data is stored in S220. Then, the process proceeds to S232 for a low alert test (see FIG. 7B). If the determination result is "NO" in S218, it is determined in S221 whether the test time exceeds a preset test time. If the determination result is "NO", the process returns to S216. If the determination result is "YES", the status of operation error in the high alert is stored in S222. Then, the process proceeds to S232 for the low alert test.

Figure 7B:
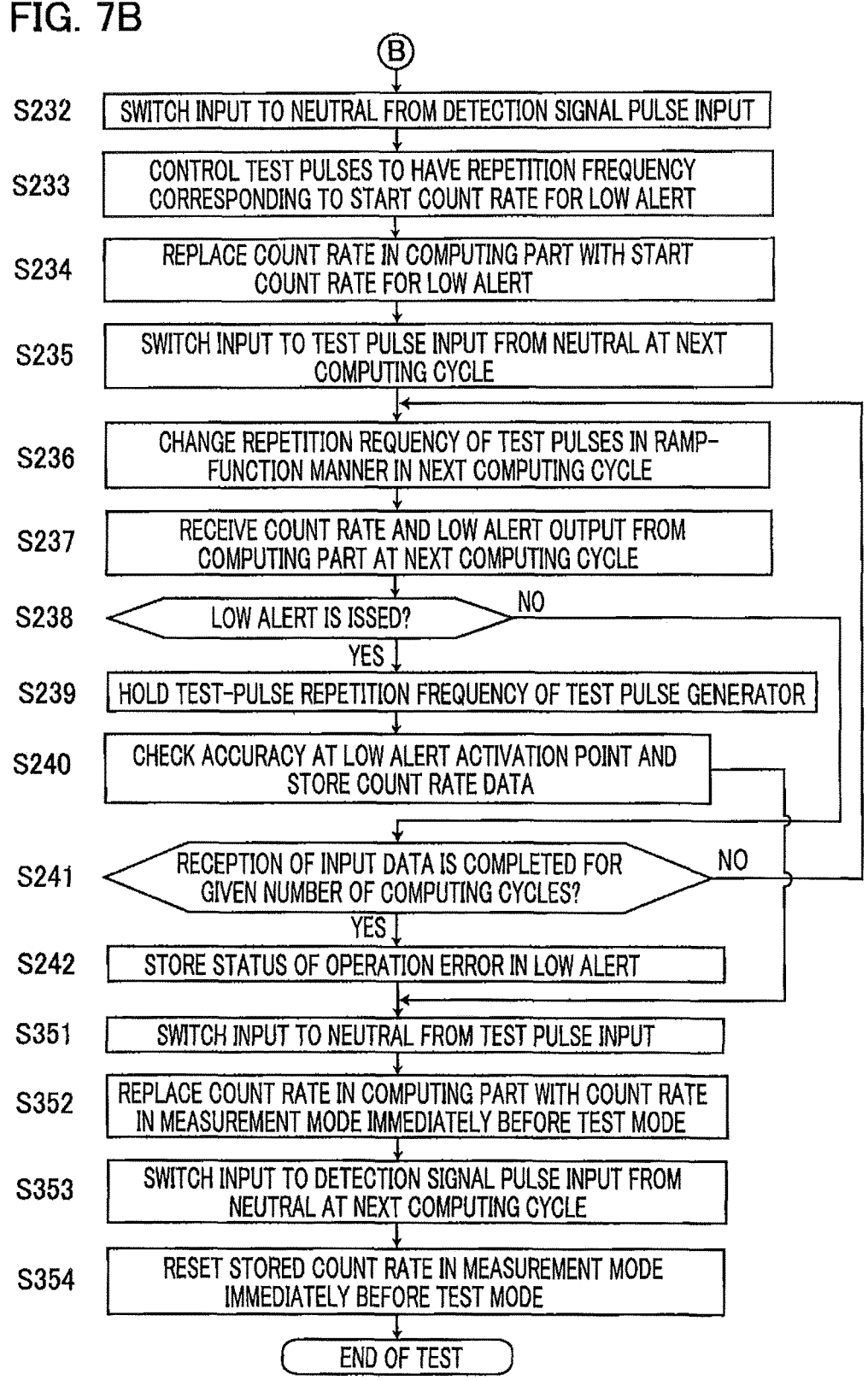
FIG. 7B is a flowchart of the latter half of the test mode according to Embodiment 3.

In the low alert test, as shown in FIG. 7B, the test pulse controller 22 switches the input of the input switching circuit 121 to neutral from the detection signal input in S232, and controls the test pulse generator 21 to generate test pulses having a repetition frequency corresponding to that of a start count rate for the low alert test in S233. Next, in S234, the count rate in the computing part 125 is replaced with a count rate the same as start count rate for the low alert test. In S235, the input of the input switching circuit 121 is switched to the test pulse input from neutral at next computing cycle. Then, the test pulses are input to the measurement unit 12. The low alert test is thus started. Then, in S236, a ramp-function variation of the repetition frequency of the test pulses from the test pulse generator 21 is approximated, similarly to the high alert test, by repetition of a minimum step decrement outputtable by the test pulse generator 21 in the subsequent computing cycles. The computing part 125 computes a count rate for the test pulse input at every computing cycle, and determines whether the count rate satisfies the condition that the count rate becomes a low alert setting level or smaller. If the condition is satisfied, the low alert is issued and the repetition frequency of the test pulse output is held at the alert-issue count rate.

The test pulse controller 22 receives the count rate and the low alert output from the computing part 125 in S237 and determines in S238 whether the low alert is issued. If the determination result is "YES" (i.e., the low alert has been issued), the test pulse generator 21 is controlled to hold the repetition frequency of the test pulses in S239. Next, accuracy of the count rate data at the low alert operation point is checked and the count rate data is stored in S240. Then, the process proceeds to S351. If the determination result is "NO" in S238, it is determined in S241 whether the test time exceeds a preset test time. If the determination result is "NO", the process returns to S236. If the determination result is "YES", the status of operation error in the low alert is stored in S242. Then, the process proceeds to S351.

In S351, the input of the input switching circuit 121 is switched to neutral from the test pulse input. In S352, the count rate in the computing part 125 is replaced with the stored count rate in the measurement mode immediately before the test mode. In next S353, the input of the input switching circuit 121 is switched to the detection signal pulse input from neutral, and the stored count rate in the measurement mode immediately before the test mode is reset in S354. Then, the alert test is finished.

Note that when only high alert test is desired to be performed, the alert test is chosen among the test items, "OPTION" is selected with "AUTO/OPTION" selection button, and further the high alert test is selected. Then, the test pulse controller 22 advances the process to S361 instead of S232 (see FIG. 7B). When only low alert test is desired to be performed, the alert test is chosen among the test items, "OPTION" is selected with "AUTO/OPTION" selection button, and further the low alert test is selected. Then, the test pulse controller 22 executes S211 before S232 (see FIGS. 7A and 7B).

An optimum slopes of repetition frequency of the ramp-function test pulses in the high alert test and the low alert test—the ramp-function variation is approximated by repetition of outputtable minimum step changes—is determined in advance by a simulation using Eq. (3) and Eq. (4) listed in Embodiment 1 since the quotient of the outputtable minimum step change divided by the period of computing cycle relates to test accuracy and the test time.

Figure 8A:
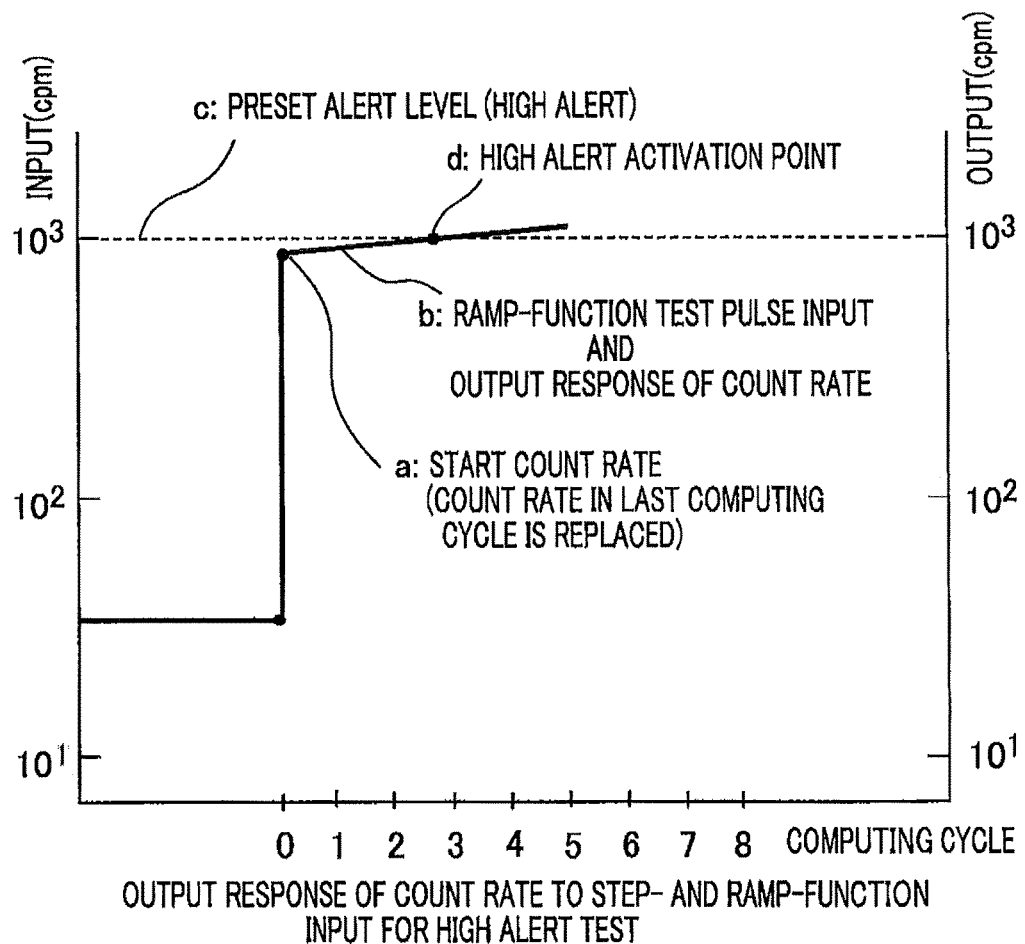
FIG. 8A is a graph showing a response of the radiation monitoring device according to Embodiment 3.
Figure 8B:
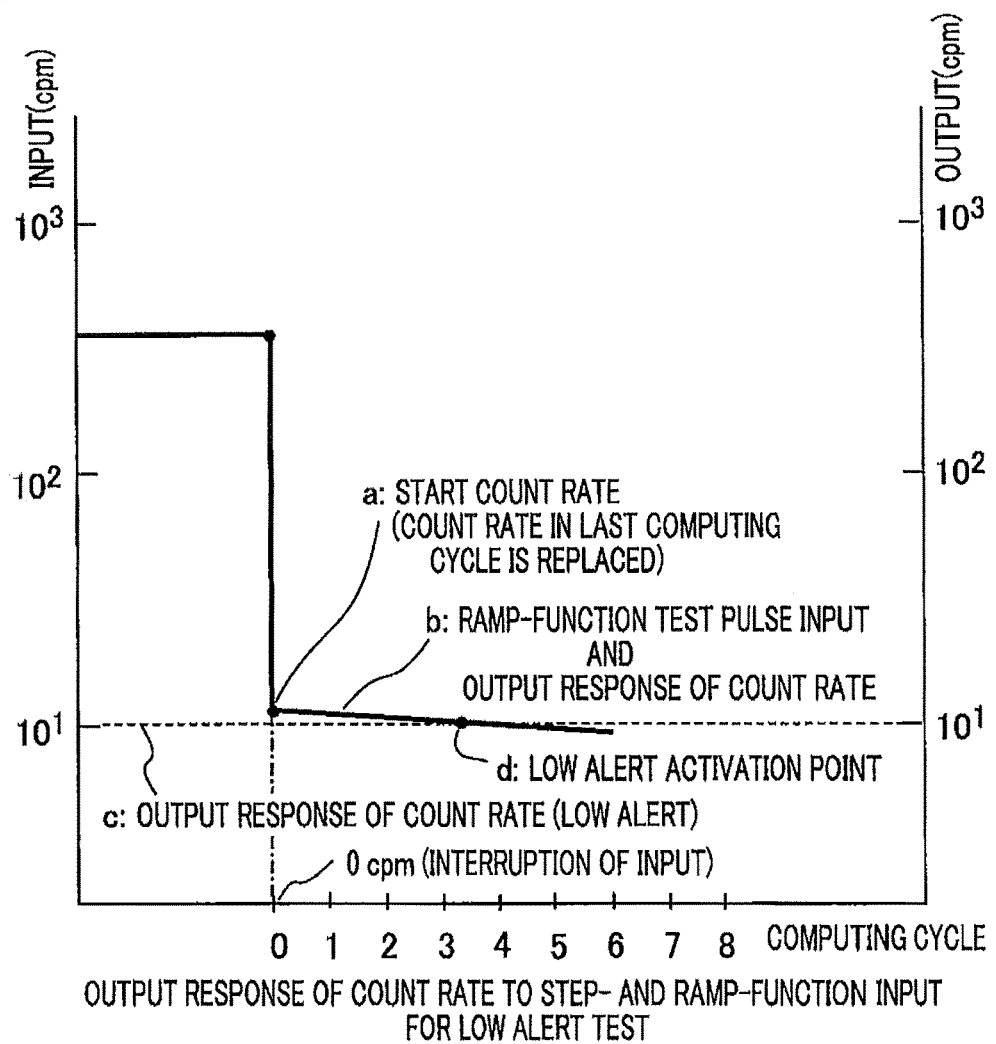
FIG. 8B is a graph showing a response of the radiation monitoring device according to Embodiment 3.

Next, the output-to-input response is described with reference to FIGS. 8A and 8B. FIGS. 8A and 8B schematically show respective output-to-input responses when a high alert test and a low alert test are automatically performed, for example, immediately after respective background count rates. In the high alert test shown in FIG. 8A, "a" represents a start count rate; "b", a ramp-function test pulse input; "c", a high alert setting level; and "d" represents a high alert activation point. The test pulse controller 22 replaces last count rate in the computing part 125 with the start count rate a, and changes the repetition frequency of the test pulses toward the start count rate a in a step-function manner and subsequently in a ramp-function manner as "b". The response of the count rate follows the ramp-function test pulse input b with a digital-error fluctuation (detailed response is not depicted). The high alert is issued at the high alert activation point d crossing the high alert setting level c.

In the low alert test shown in FIG. 8B, "a" represents a start count rate; "b", a ramp-function test pulse input; "c", a low alert setting level; and "d" represents a low alert activation point. The test pulse controller 22 replaces last count rate in the computing part 125 with the start count rate a, and changes the repetition frequency of the test pulses toward the start count rate a in a step-function manner (for hastening the response, the repetition frequency may be changed in a step-function manner to zero or a value sufficiently lower than the lower limit of measurement range) and subsequently in a ramp-function manner as "b". The count rate responds gradually—the time rate of the variation is approximately {((start count rate)−(count rate at the alert setting level)}/(time constant)—to the ramp-function input b with a digital-error fluctuation (detailed response is not depicted). The low alert is issued at the low alert activation point d crossing the low alert setting level c.

As has been described above, the test pulse controller 22 switches the input of the input switching circuit 121, replaces last count rate stored in the computing part 125 with a start count rate close to an alert setting level, and inputs test pulses to the radiation monitor 1 from the test pulse generator 21 with the test pulses being varied in a ramp manner at minimum changes. Moreover, the high alert test and the low alert test are sequentially performed in an effective manner. Furthermore, a measurement mode is quickly resumed from a test mode. With the above operation, the alert test time can be significantly reduced.

Embodiment 4

Figure 9:
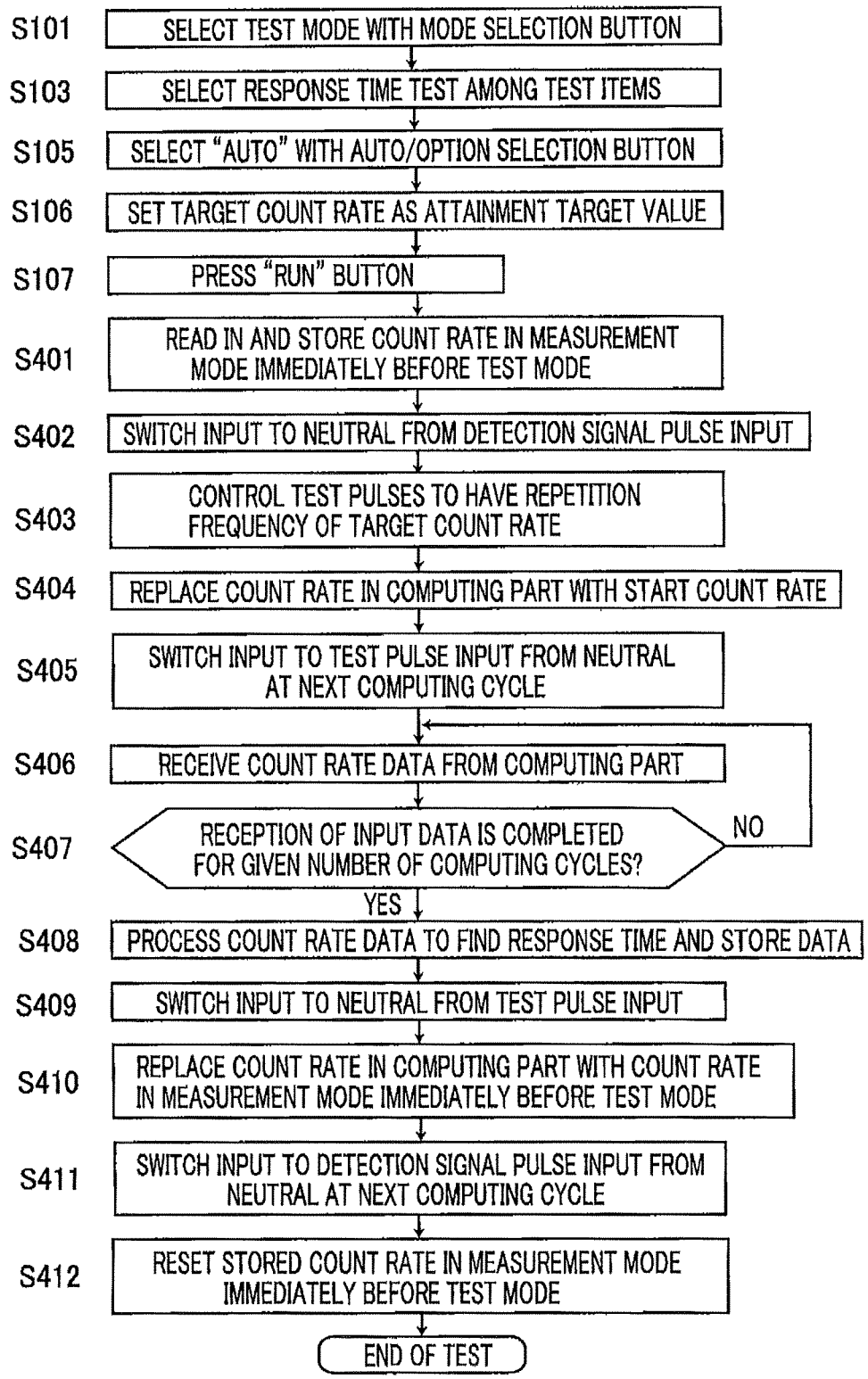
FIG. 9 is a flowchart of a test mode according to Embodiment 4 of the present invention.

Embodiment 4 will be described with reference to the flowchart shown in FIG. 9. When a response time test is chosen among the test items, a target count rate is set as a start count rate, and "RUN" button is pressed, the test pulse controller 22 executes S401 through S412 the same as S001 through S012 shown in FIG. 2 of Embodiment 1. As for the difference between the output-to-input response test in Embodiment 1 and the response time test in Embodiment 4, while the target count rate and the start count rate is the same in the output-to-input response test, the target count rate and the start count rate is different in the response time test because the response time test is for measuring a response time from a start count rate to a target count rate. In addition, the count rate data is processed in S408 to find a response time or a time constant from the number of computing cycles, for example, from 10% to 90% of the target count rate.

Figure 10:
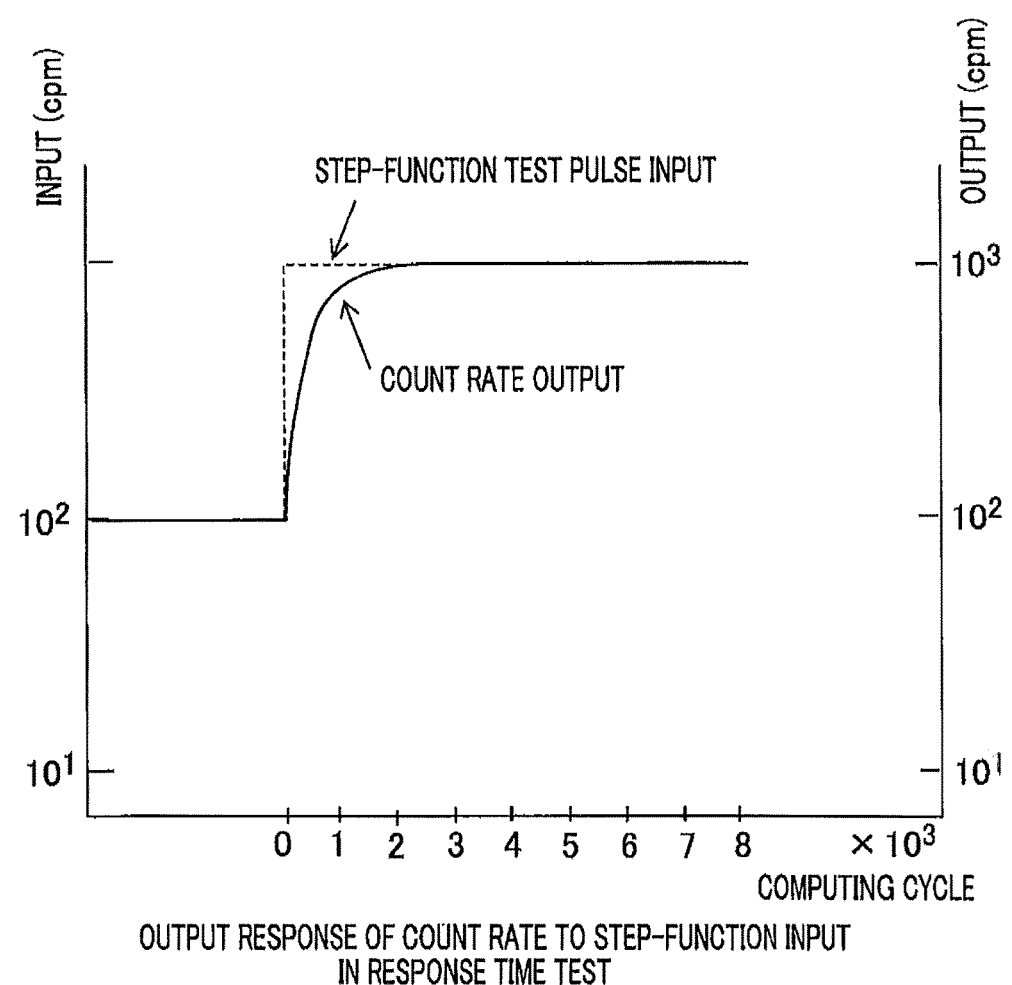
FIG. 10 is a graph showing a response of a radiation monitoring device according to Embodiment 4.

As shown in FIG. 10, a response time or a time constant to an input of step-function increase of the test pulses can be measured, for example, from last count rate and an output count rate responding exponentially to the input increased from last count rate as a start point. The test unit 2 can perform easily a non-routine test such as response time measurement and a time constant measurement merely with operation of the selection button and input of a target count rate.

Embodiment 5

Figure 11:
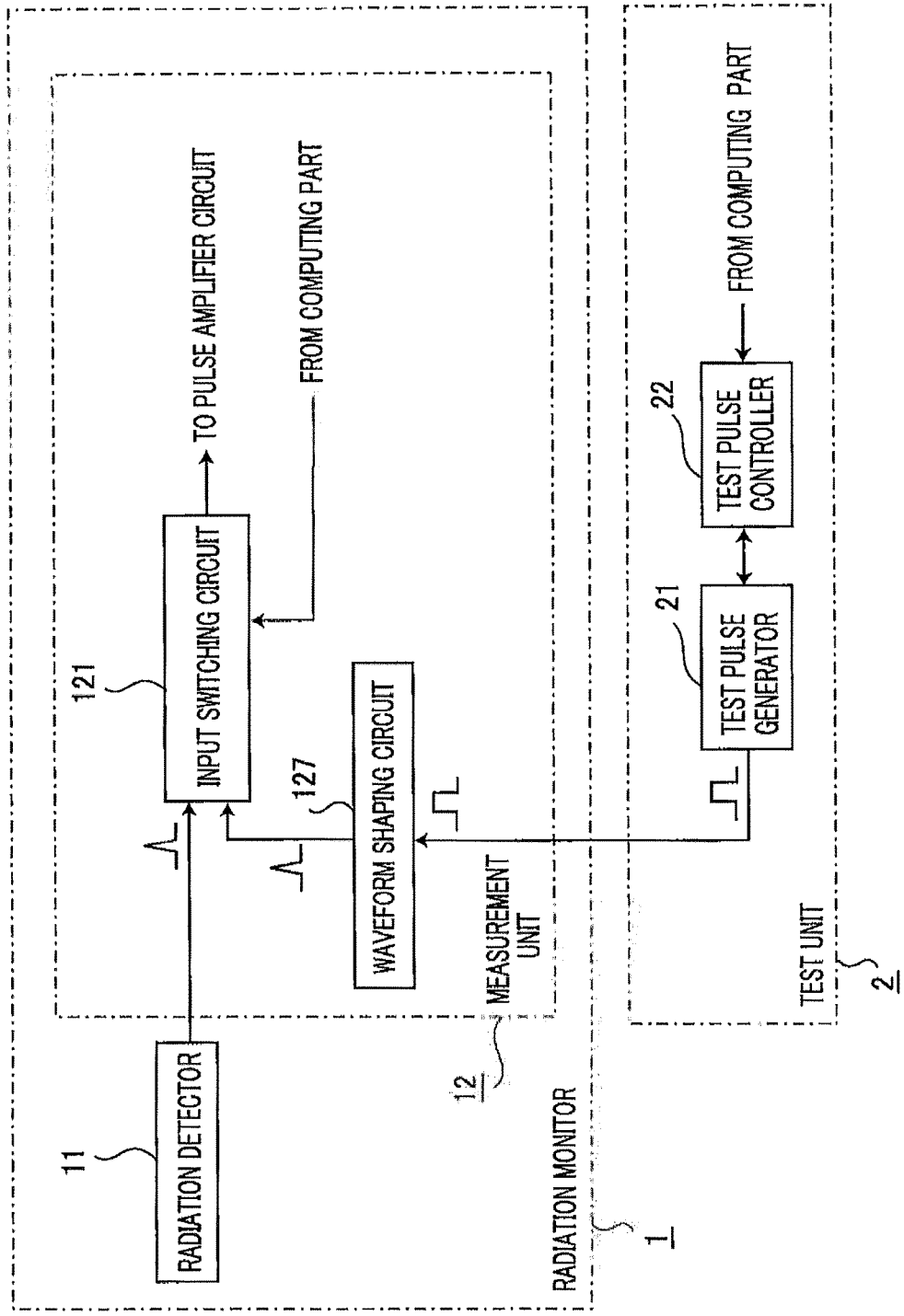
FIG. 11 is a diagram showing a configuration of a radiation monitoring device according to Embodiment 5 of the present invention.

In Embodiment 5, the measurement unit 12 is further provided with a waveform shaping circuit 127 as shown in FIG. 11 to shape waveform of the input test pulses. The test pulse controller 22 controls height and width of the test pulses output from the test pulse generator 21 to form simulation signal pulses simulating detection signal pulses for height and width of the test pulses output from the waveform shaping circuit 127. Thus, varying the height and width of the test pulses brings about an effect of applicability also to a check test on gain of the pulse amplifier circuit 122 and to a check test on an actual operating point of the noise discriminating and removing circuit 123, and the like.

Embodiment 6

Figure 12:
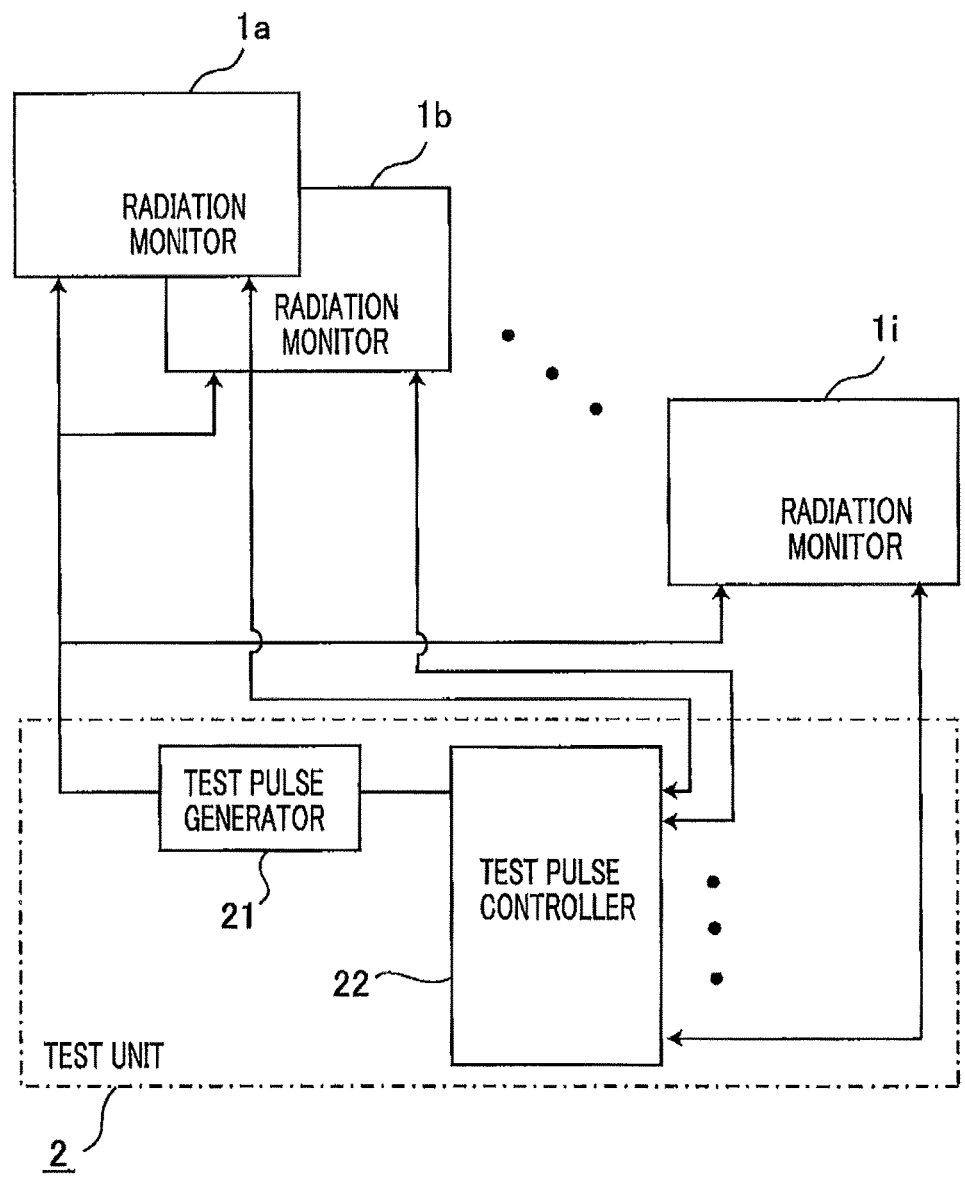
FIG. 12 is a diagram showing a configuration of a radiation monitoring device according to Embodiment 6 of the present invention.

In Embodiment 6, a radiation monitoring device includes a plurality of radiation monitors 1*a*, 1*b*, . . . , 1*i* as shown in FIG. 12, and a test unit 2 is designed to be capable of simultaneously performing tests for the plurality of radiation monitors 1*a*, 1*b*, . . . , 1*i*. This brings about effects of further reducing the test time and shortening the test period as well.

Appropriate combinations, modifications, alterations and omissions of the embodiments will be apparent to those skilled in the art without departing from the scope and spirit of the invention, and it should be understood that this is not limited to the illustrative embodiments set forth herein.

The invention claimed is:

1. A radiation monitoring device, comprising:
a radiation monitor that measures radiation; and
a test circuit that tests the radiation monitor,
wherein either a measurement mode or a test mode is selectable, and the test mode is selected at a test and the measurement mode is selected ordinarily at radiation monitoring,
the radiation monitor including:
a radiation detector that detects radiation and outputs detection signal pulses; and
a measurement circuit that receives the detection signal pulses and measures a count rate,
the test circuit including:
a test pulse generator that generates test pulses; and
a test pulse controller that controls a repetition frequency of the test pulses output from the test pulse generator and switches an input of the measurement circuit, the measurement circuit including:
a pulse amplifier circuit that shapes a waveform of the detection signal pulses and amplifies a height of the detection signal pulses, and removes high frequency noise superimposed on the detection signal pulses;
a noise discriminating and removing circuit that discriminates and removes a noise pulse from the output pulses of the pulse amplifier circuit, and outputs digital pulses;
a counter circuit that receives and counts the digital pulses;
a computing part that receives count values output from the counter circuit and computes, on the basis of a time constant, a constant cycle time, a current count value, and last count rate, a current count rate with a standard deviation of the count values kept constant;
a display and operation part that displays an output of the computing part and receives an operation for the measurement circuit; and
an input switching circuit that switches an input of the pulse amplifier circuit to either one of an input of the detection signal pulses, neutral with no input, or an input of the test pulses under control of the test pulse controller via the computing part,
wherein when the test mode is selected and then an output-to-input response test for measuring linearity of output to input is chosen as the test item, the test pulse controller switches the input switching circuit to neutral from the detection signal pulse input or the test pulse input; changes the repetition frequency of the test pulses to that at an initial test point in a step-function manner; replaces a count rate in the computing part at a current computing cycle with a start count rate the same as that at the initial test point; and switches the input switching circuit to the test pulse input from neutral at a next computing cycle, whereby the test circuit automatically performs output-to-input response tests sequentially at preset test points over given entire measurement ranges.

2. The radiation monitoring device of claim 1, wherein when the test mode is selected and then an alert test for checking a count rate at an alert activation point is chosen as the test item,
in a case of the alert test being a high alert test, the test pulse controller switches the input switching circuit to neutral from the detection signal pulse input or the test pulse input; then changes the repetition frequency of the test pulses in a step-function manner to a repetition frequency of a start count rate satisfying a relationship that a count rate at a high alert setting level being a high alert activation level is larger than the start count rate; replaces a count rate in the computing part at a current computing cycle with the start count rate; switches the input switching circuit to the test pulse input from neutral at a next computing cycle; and then varies the repetition frequency of the test pulses from that of the start count rate in a ramp-function manner so that the test pulse frequency gradually crosses the high alert setting level, and the computing part computes a count rate of the test pulse input at every computing cycle; determines whether the count rate becomes the high alert setting level or larger; and issues a high alert and holds the count rate of the high alert setting level or larger if the relationship is satisfied, and
in a case of the alert test being a low alert test, the test pulse controller switches the input switching circuit to neutral from the detection signal pulse input; then changes the repetition frequency of the test pulses in a step-function manner to a start count rate satisfying a relationship that a count rate at a low alert setting level being a low alert activation level is smaller than the start count rate; replaces a count rate in the computing part at a current computing cycle with the start count rate; and switches the input switching circuit to the test pulse input from neutral at a next computing cycle; and varies the repetition frequency of the test pulses from that of the start count rate in a ramp-function manner so that the test pulse frequency gradually crosses the low alert setting level, and the computing part computes a count rate of the test pulse input at every computing cycle; determines whether the count rate becomes the low alert setting level or smaller; and issues a low alert and holds the count rate at the low alert setting level or smaller if the relationship is satisfied,
wherein the test circuit automatically performs the high alert test and the low alert test sequentially.

3. The radiation monitoring device of claim 1, wherein when the test mode is selected, an output-to-input response time test is chosen, and a start count rate for the test mode is set, then the test pulse controller switches the input switching circuit to neutral; then changes the repetition frequency of the test pulses in a step-function manner to that corresponding to the start count rate; replaces a count rate in the computing part at a current computing cycle with the start count rate; and switches the input switching circuit to the test pulse input at a next computing cycle, wherein the test circuit measures an output-to-input response time.

4. The radiation monitoring device of claim 1, wherein the test pulse controller stores, when the input switching circuit switches to the test pulse input from the detection signal pulse input, a count rate in a last measurement mode, and replaces, when the measurement mode is resumed from the test mode after the output-to-input response tests are performed, a count rate immediately after the resumption with the count rate in the last measurement mode.

5. The radiation monitoring device of claim 1, wherein the measurement circuit further includes a waveform shaping circuit that shapes a waveform of the input test pulses when the test pulses are input, and controls height and width of the test pulses output from the test pulse generator to vary height and width of the test pulses.

6. The radiation monitoring device of claim 1 including a plurality of radiation monitors each being the radiation monitor, wherein the test circuit performs the tests for the plurality of radiation monitors.

\* \* \* \* \*